(12) United States Patent
Lagakos et al.

(10) Patent No.: US 9,599,505 B2
(45) Date of Patent: Mar. 21, 2017

(54) FIBER OPTIC DIRECTIONAL ACOUSTIC SENSOR

(71) Applicants: Nicholas Lagakos, Silver Spring, MD (US); Joseph A. Bucaro, Herndon, VA (US); Brian H. Houston, Fairfax, VA (US)

(72) Inventors: Nicholas Lagakos, Silver Spring, MD (US); Joseph A. Bucaro, Herndon, VA (US); Brian H. Houston, Fairfax, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 565 days.

(21) Appl. No.: 14/100,277

(22) Filed: Dec. 9, 2013

(65) Prior Publication Data
US 2014/0290372 A1 Oct. 2, 2014

Related U.S. Application Data

(60) Provisional application No. 61/735,074, filed on Dec. 10, 2012.

(51) Int. Cl.
*G01P 3/36* (2006.01)
*G01D 5/32* (2006.01)
*G01H 9/00* (2006.01)

(52) U.S. Cl.
CPC .................. *G01H 9/004* (2013.01)

(58) Field of Classification Search
CPC .......... G01D 5/268; G01D 5/30; G01H 9/004; G01K 5/62; G01P 15/093; G02B 6/3514; G02B 6/3566
USPC ......... 356/27; 73/655; 374/188, 205, E5.037
See application file for complete search history.

(56) References Cited

U.S. PATENT DOCUMENTS

| | | | |
|---|---|---|---|
| 6,536,553 B1* | 3/2003 | Scanlon | G01N 29/069 181/108 |
| 6,788,417 B1* | 9/2004 | Zumberge | G01H 9/004 356/477 |
| 2003/0150262 A1* | 8/2003 | Han | E21B 47/101 73/152.18 |
| 2009/0196543 A1* | 8/2009 | Lagakos | G01D 5/268 385/12 |

(Continued)

*Primary Examiner* — Sunghee Y Gray
(74) *Attorney, Agent, or Firm* — US Naval Research Laboratory; Suresh Koshy

(57) ABSTRACT

A fiber optic acoustic sensor and a method of using same. The sensor includes a light emitting diode and a fiber optic probe having a transmitting multimode optical fiber and at least one receiving multimode optical fiber. The transmitting multimode optical fiber and the receiving multimode optical fiber are substantially parallel to a longitudinal axis of the probe. The fiber optic probe communicates with the light emitting diode. The sensor further includes a cantilever, which includes a cantilever rod. The cantilever rod includes a proximal end with an edge reflector located thereon. The edge reflector is spaced apart from the fiber probe and oriented to face said fiber probe. The edge reflector is able to move in a direction substantially perpendicular to the longitudinal axis of the fiber optic probe. The sensor further includes a light intensity detector communicating with the fiber optic probe.

13 Claims, 16 Drawing Sheets

(56) References Cited

U.S. PATENT DOCUMENTS

| | | | |
|---|---|---|---|
| 2009/0252451 A1* | 10/2009 | Lagakos | G01D 5/268 385/13 |
| 2011/0044373 A1* | 2/2011 | Lagakos | G01K 5/62 374/188 |
| 2011/0305116 A1* | 12/2011 | Lagakos | G01H 9/004 367/149 |

* cited by examiner

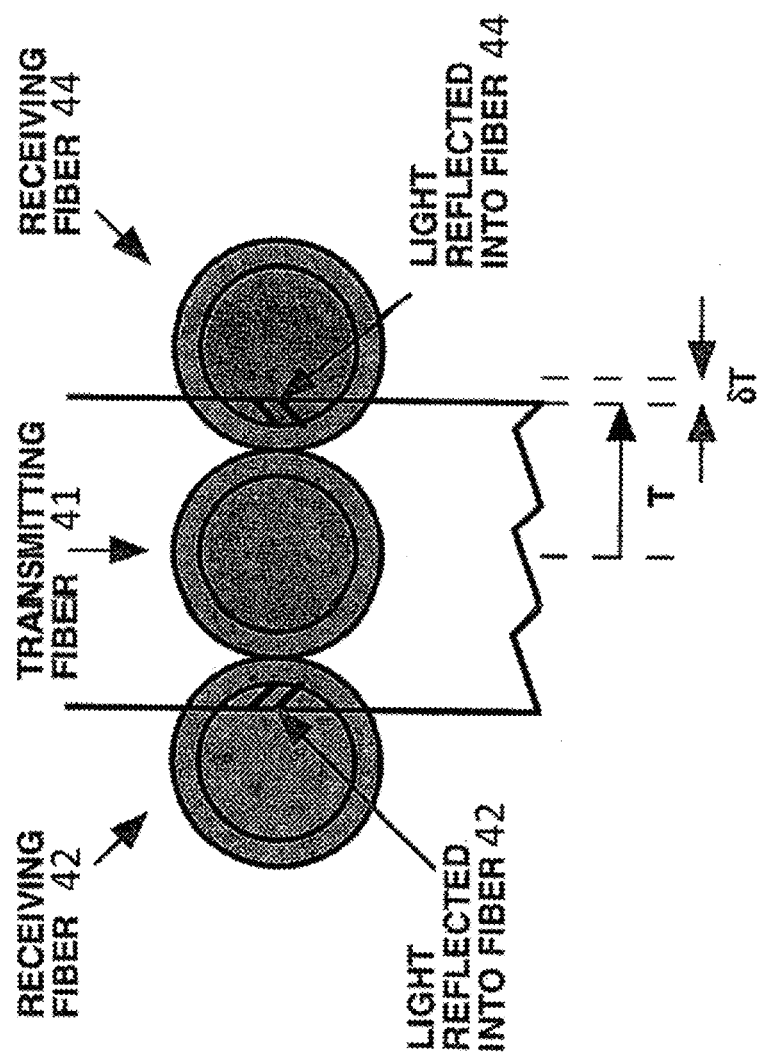

FIBER OPTIC DIRECTIONAL ACOUSTIC SENSOR

CROSS-REFERENCE TO RELATED APPLICATIONS

The present application claims priority to U.S. Provisional Patent Application Ser. No. 61/735,074, which was filed on 10 Dec. 2013.

BACKGROUND OF THE INVENTION

Field of the Invention

This invention relates in general to a device and method for acoustic sensing, and in particular to a device and method for acoustic sensing using a multi-fiber optical probe.

Description of the Related Art

Most acoustic sensor applications requiring directional acoustic source information employ processing of signals received on spatial arrays of omnidirectional pressure sensors. Acoustic vector sensors—defined as a sensor able to measure both pressure and particle motion (e.g., displacement, velocity, or acceleration)—offer a number of advantages including comparable directivity with a physically smaller array, as well as some degree of directional information using only a single sensor. Further, directivity gains can be achieved even when single axis vice tri-axial vector sensors are employed.

Typically, an acoustic vector sensor is realized by using two co-located sensors, such as piezo-electric transducers ("PZTs"), one a monopole or omnidirectional dynamic pressure sensor and the other a dipole or directional sensor. The latter is usually obtained by exploiting one of two principles: (1) inertial sensing involving displacement, velocity, or acceleration or (2) pressure gradient detection. In all cases, sensor directionality is achieved because of the vector nature of each of these quantities. Examples of such devices include vector sensors whose directional component uses piezoelectric accelerometers and particle velocity sensors, which uses a moving coil. Examples of more specialized devices include sensors that sense the pressure gradient or acoustic flow.

Typically, the advantages associated with deploying directional sensors are enhanced if the device is small and robust and consumes comparatively little power. Low power is especially important in certain underwater applications, where one desires operation over a long time period but regular access to the deployed sensors might not be possible. For applications in air, the lack of sensitivity to electromagnetic interference ("EMI") can also be important. Finally, some applications require very low frequency (e.g., sub-Hertz) performance, which can be difficult to achieve with piezo-based approaches because of the significant increase in electrical self-noise at these very low frequencies.

BRIEF SUMMARY OF THE INVENTION

An embodiment of the invention includes a fiber optic acoustic sensor including a light emitting diode. The sensor includes a fiber optic probe having a transmitting multimode optical fiber and at least one receiving multimode optical fiber. The transmitting multimode optical fiber and the at least one receiving multimode optical fiber are substantially parallel to a longitudinal axis of the probe. The fiber optic probe communicates with the light emitting diode. The sensor includes a cantilever including a cantilever rod. The cantilever rod includes a proximal end with an edge reflector located thereon. The edge reflector is spaced apart from the fiber probe and oriented to face the fiber probe. The edge reflector is able to move in a direction substantially perpendicular to the longitudinal axis of the fiber optic probe. The sensor includes a light intensity detector communicating with the fiber optic probe. In operation, the transmitting multimode optical fiber transmits light from the light emitting diode toward the edge reflector. The edge reflector reflects at least a portion of the light toward the at least one receiving multimode optical fiber. An amount of light received by the receiving multimode optical fiber indicates a relative displacement of the edge reflector with respect to the fiber probe in a direction perpendicular to the longitudinal axis of the fiber probe.

Optionally, the light intensity detector includes one of a PIN detector and a photomultiplier.

Optionally, the cantilever includes glass, metal (such as steel), a bi-metallic material, or plastic (such as acrylic).

Optionally, the at least one receiving multimode optical fiber includes four receiving multimode optical fibers. The four receiving multimode optical fibers includes two pairs of opposing receiving multimode optical fibers. Optionally, the fiber optic acoustic sensor further includes a plurality of solid rods or a plurality of dummy optical fibers located between adjacent receiving multimode optical fibers of the four receiving multimode optical fibers.

Optionally, the at least one receiving multimode optical fiber includes six receiving multimode optical fibers, said six receiving multimode optical fibers including three pairs of opposing receiving multimode optical fibers.

Optionally, the fiber optic probe includes a probe end. The fiber optic acoustic sensor further includes a casing enclosing the probe end and the cantilever rod. Optionally, the casing includes a plastic material. Optionally, the casing includes a fill liquid surrounding the probe end and the cantilever rod. Optionally, the fill fluid includes one of a glycerin solution, an ethylene glycol solution, and a glycerin-water solution. Optionally, the casing includes an acoustic impedance proximate to a product of a density of fluid external to the casing and a speed of sound in the fluid external to the casing.

Optionally, the casing includes a fill liquid surrounding the probe end and the cantilever rod. The cantilever rod includes a distal end. The fiber optic acoustic sensor further includes a cantilever mount connected to the distal end of the cantilever rod, and a boot, the fiber optic probe and the cantilever mount being connected to the boot. Optionally, the fill fluid includes one of a glycerin solution, an ethylene glycol solution, and a glycerin-water solution. Optionally, the boot includes a rubber material or a biaxially-oriented polyethylene terephthalate film material.

Another embodiment of the invention includes a method of measuring particle velocity in an acoustic wave or a pressure gradient of the acoustic wave using a fiber optic acoustic sensor. The fiber optic acoustic sensor includes a light emitting diode. The fiber optic probe has a transmitting multimode optical fiber and at least one receiving multimode optical fiber. The transmitting multimode optical fiber and the at least one receiving multimode optical fiber is substantially parallel to a longitudinal axis of the probe. The fiber optic probe communicates with the light emitting diode. The fiber optic acoustic sensor includes a cantilever including a cantilever rod. The cantilever rod includes a proximal end with an edge reflector located thereon. The edge reflector is spaced apart from the fiber probe and oriented to face the fiber probe. The edge reflector is able to move in a direction substantially perpendicular to the longitudinal axis of the fiber optic probe. The fiber optic acoustic sensor includes a light intensity detector communicating with the fiber optic probe. In operation, the transmitting multimode optical fiber transmits light from the light emitting diode toward the edge reflector. The edge reflector reflects at least a portion of the light toward the at least one receiving multimode optical fiber. An amount of light received by the receiving multimode optical fiber indicates a relative displacement of the edge reflector with respect to the fiber probe in a direction perpendicular to the longitudinal axis of the fiber probe. The method includes locating the fiber optic acoustic sensor in an external fluid. The method includes detecting particle excitation in the external fluid using the fiber optic acoustic sensor. The method includes determining velocity in at least an X-direction of a source of the particle excitation based in part on the amount of light received by the receiving multimode optical fiber.

Optionally, the determining velocity in at least an X-direction of the particle excitation includes determining velocity in an X direction of the particle excitation and velocity in a Y-direction of the particle excitation. The at least one receiving multimode optical includes four receiving multimode optical fibers, the four receiving multimode optical fibers including two pairs of opposing receiving multimode optical fibers.

Optionally, the determining velocity in at least an X-direction of the particle excitation includes determining velocity in an X direction of the particle excitation, velocity in a Y-direction of the particle excitation, and velocity in a Z-direction of the particle excitation, wherein the at least one receiving multimode optical includes six receiving multimode optical fibers, the six receiving multimode optical fibers including three pairs of opposing receiving multimode optical fibers.

Optionally, the fiber optic probe includes a probe end, wherein the fiber optic acoustic sensor further includes a casing enclosing the probe end and the edge reflector, the casing including a fill liquid surrounding the probe end and the cantilever rod. Optionally, the fill fluid includes one of a glycerin solution, an ethylene glycol solution, and a glycerin-water solution. Optionally, the casing includes a fill liquid surrounding the probe end and the cantilever rod, the fill fluid including one of a glycerin solution, an ethylene glycol solution, and a glycerin-water solution, wherein the cantilever rod includes a distal end, wherein the fiber optic acoustic sensor further includes a cantilever mount connected to the distal end of the cantilever rod, and a boot, the fiber optic probe and the cantilever mount being connected to the boot.

An embodiment of the instant invention includes a fiber optic directional acoustic receiver that detects both the direction and the intensity of an incident acoustic wave. Such receivers are, for instance, small, light, immune to EMI, and inexpensive. Also, they can be operated remotely and can be easily multiplexed.

BRIEF DESCRIPTION OF THE DRAWINGS

FIG. 9B is a schematic showing coordinates of a two-fiber probe according to an embodiment of the invention, wherein the fiber optic probe includes more than one receiving fiber.

DETAILED DESCRIPTION OF THE INVENTION

Figure 1A:
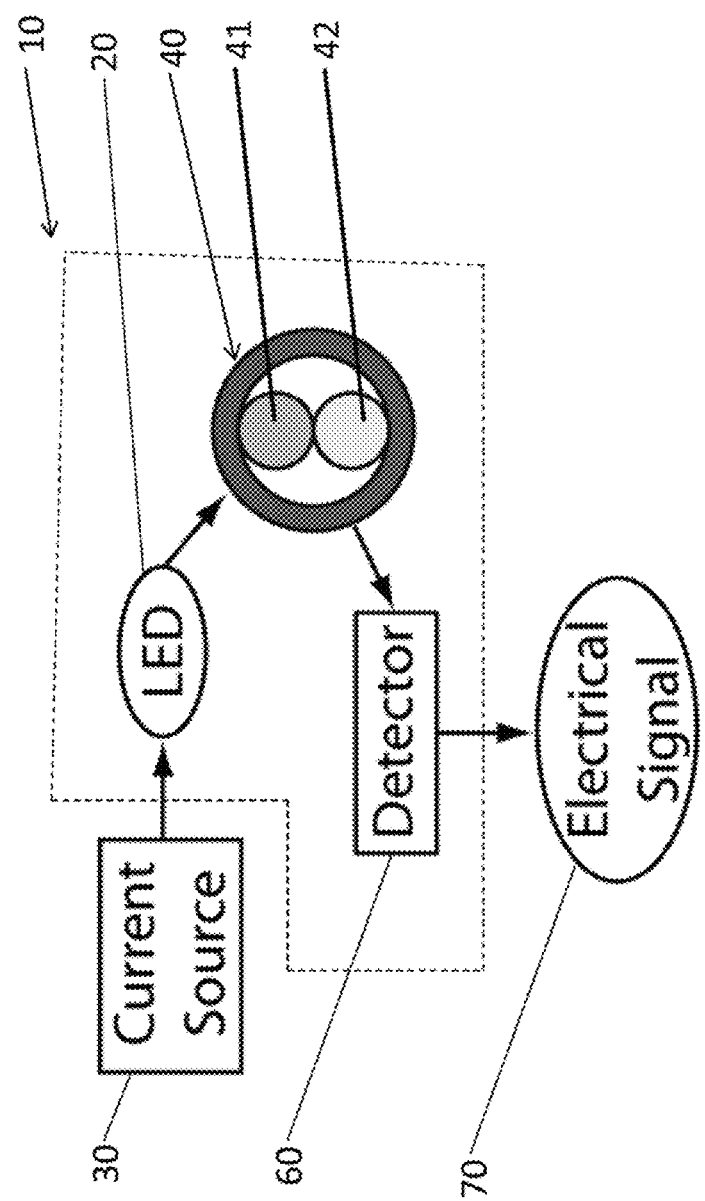
FIG. 1A is a schematic view of a two-fiber, fiber optic directional sensor according to an embodiment of the instant invention.

An embodiment of the instant directional acoustic sensor is based on a two-fiber optical probe, which detects the acoustically induced bending of a slender cantilevered rod. This sensor builds on an optical fiber microphone described in U.S. Pat. No. 7,792,395 to Lagakos et al., which is incorporated herein by reference. The microphone, for example, uses an LED-excited seven fiber optical probe with an attached micro-machined silicon diaphragm. Acoustically induced dynamic normal displacements of the reflecting diaphragm cause light level fluctuations in the returning fibers of the probe. This intensity modulation is detected by a photo-detector whose resulting electrical output is proportional to the dynamic acoustic pressure amplitude. The component and fabrication costs of the microphone are low as is the required electrical power. For example, with the electro-optic components used here, a single sensor would require <100 mW, whereas several multiplexed sensors would only increase this to ~150 mW. Further, the sensor exhibits a broadband response with a low threshold detection level. As the LED has an unusually low level of 1/f noise, the microphone can be used for infrasonic measurements down to very low, even pseudo-static frequencies while maintaining low threshold detection capability.

Motivated by the successful development of the above-mentioned optical fiber microphone, Applicants considered using the optical fiber microphone to sense a pressure gradient and/or velocity vice pressure associated with an acoustic wave in a fluid. Applicants have determined that a relatively small, low cost, low power, EMI-proof, low frequency directional acoustic sensor according to the instant invention takes advantage of the vector nature of these acoustic quantities as opposed to the scalar nature of the pressure. The particular concept reported here involves a two-fiber probe constructed with the same optical fibers used in the microphone, combined with an edge reflector mounted on the face of a cantilever rod in which acoustically induced cantilever lateral displacement modulates the light level received by the return fiber. The LED and detector are also identical to those used in the seven fiber probe microphone described below so that one can expect the same low levels of 1/f noise leading to very low frequency detection capability.

An embodiment of the instant invention is discussed as follows with reference to FIGS. 1A-1B, 2A-2B, and 4A-4C. The embodiment of the instant invention includes a fiber optic acoustic sensor 10 including a standard light emitting diode 20. Light emitting diode 20 is powered, for example, by a standard current source 30. The sensor 10 includes a fiber optic probe 40 having a transmitting multimode optical fiber 41 and at least one receiving multimode optical fiber 42. The transmitting multimode optical fiber 41 and the at least one receiving multimode optical fiber 42 are substantially parallel to a longitudinal axis of the probe 40. The fiber optic probe 40 communicates with the light emitting diode 20. The sensor includes a cantilever 50 including a cantilever rod 51. The cantilever rod 51 includes a proximal end with a standard edge reflector 55 located thereon. For example, the edge reflector includes a standard thin film (e.g., biaxially-oriented polyethylene terephthalate coated with a standard reflective metal such as silver or gold) attached to the cantilever rod using standard epoxy, or a standard thin film evaporated onto the cantilever rod. For example, the edge reflector 55 has a cross-sectional shape of a strip or of a square. One of ordinary skill in the art will appreciate that an embodiment of the invention having one fiber optic probe communicating with a strip-shaped edge reflector is amenable to detecting velocity in an X-direction, an embodiment of the invention having two orthogonal fiber optic probes communicating with two strip-shaped edge reflectors is amenable to detecting velocity in an X-direction and a Y-direction, and an embodiment of the invention having one fiber optic probe communicating with a strip-shaped edge reflector is amenable to detecting velocity in an X-direction and a Y-direction. The edge reflector 55 is spaced apart from the fiber optic probe 40 and oriented to face the fiber optic probe. The edge reflector 55 is able to move in a direction substantially perpendicular to the longitudinal axis of the fiber optic probe 40. The sensor includes a standard light intensity detector 60 communicating with the fiber optic probe 40. The light intensity detector 50 outputs an electrical signal 70 that is, for example, sent to a standard analyzer or standard display device. In operation, the transmitting multimode optical fiber 41 transmits light from the light emitting diode 20 toward the edge reflector 55. The edge reflector 55 reflects at least a portion of the light toward the at least one receiving multimode optical fiber 42. An amount of light received by the at least one receiving multimode optical fiber 42 indicates a relative displacement of the edge reflector 55 with respect to the fiber optic probe 40 in a direction perpendicular to the longitudinal axis of the fiber optic probe.

One of ordinary skill in the art will appreciate that although the fiber optic acoustic sensor 10 described above includes a fixed fiber optic probe 40 and an edge reflector 55 movable relative to the fiber optic probe, an equivalent embodiment of the invention includes a fixed edge reflector 55 and a fiber optic probe 40 movable relative to the edge reflector. In either such embodiment, one of ordinary skill in the art would recognize that the principle of operation would remain the same.

Optionally, the light intensity detector 60 includes a standard PIN detector or a standard photomultiplier.

Optionally, the cantilever 50 includes glass, metal (e.g., steel), a bi-metallic material (for example, which deforms according to temperature), or plastic (e.g., acrylic).

Figure 4A:
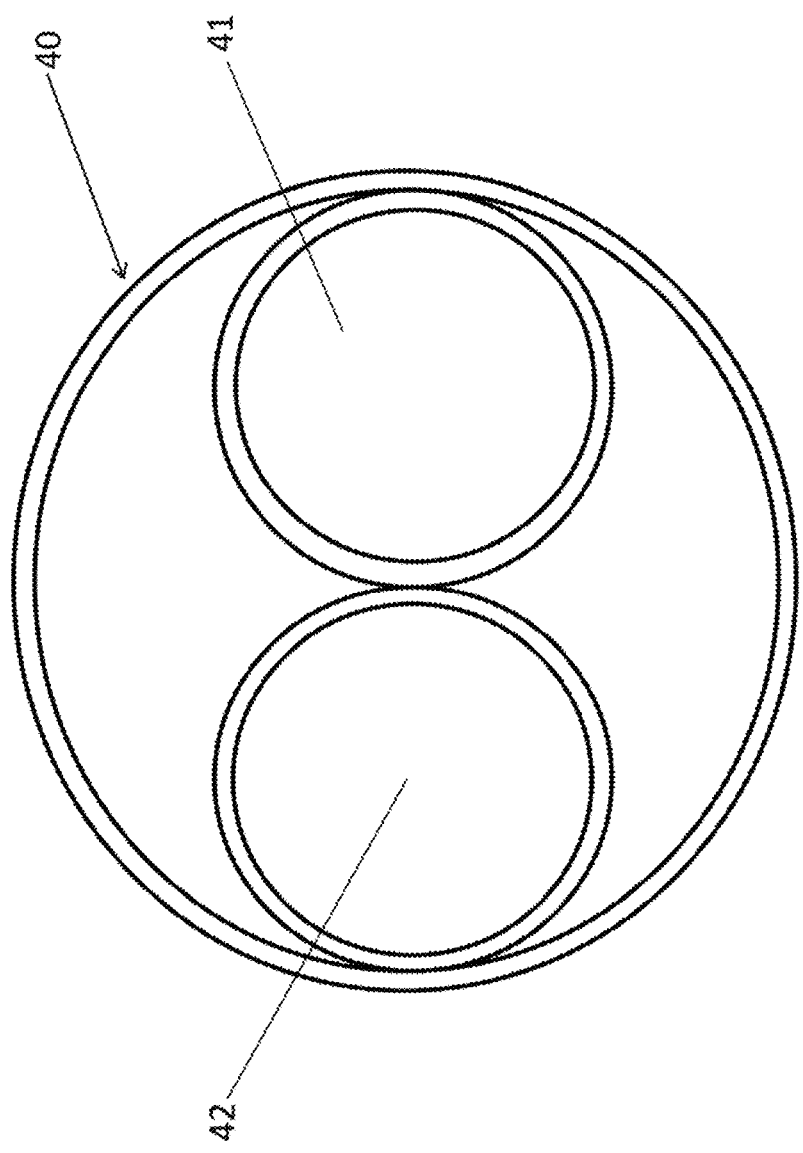
FIG. 4A is a cross-section of a two-fiber probe according to an embodiment of the instant invention and does not show the location of the edge reflector at rest for ease of understanding.
Figure 4B:
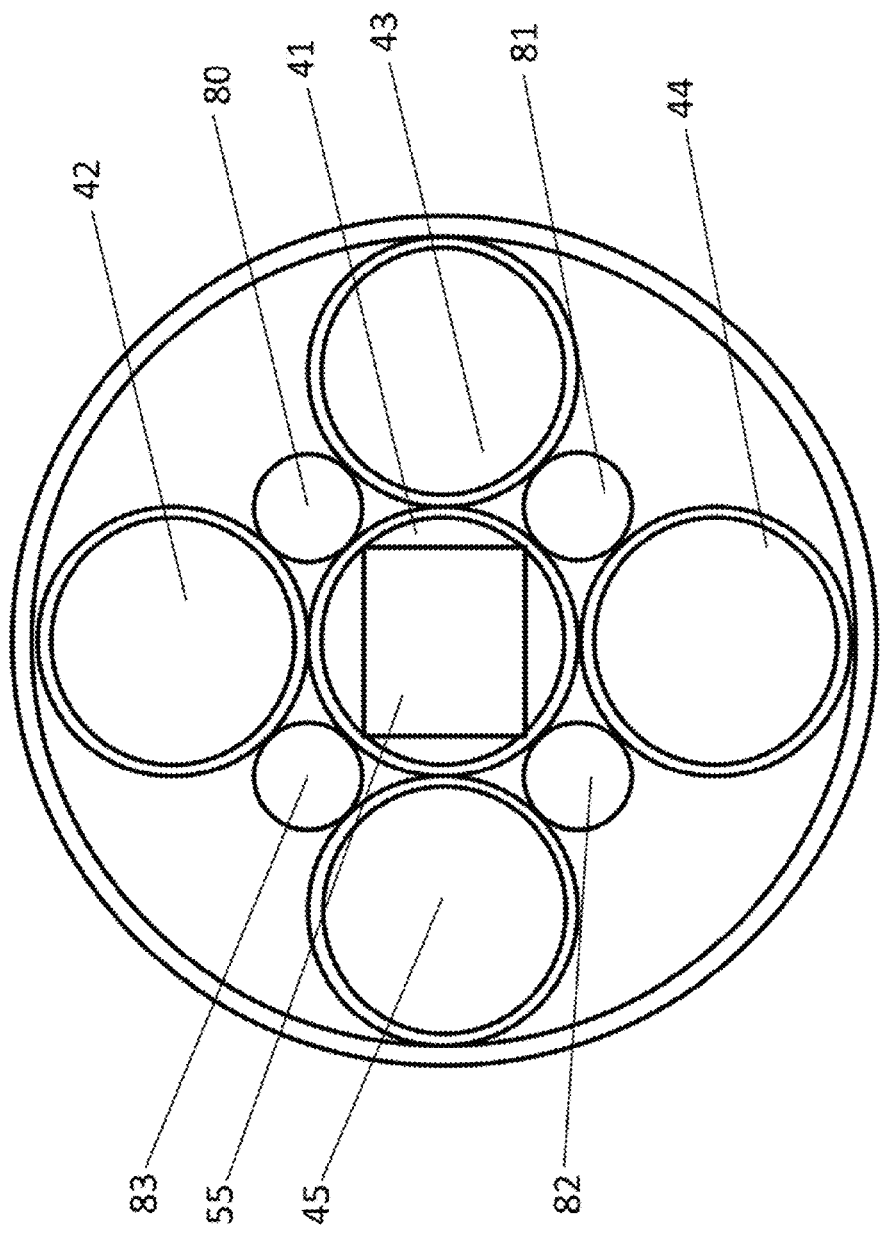
FIG. 4B is a cross-section of a five-fiber probe according to an embodiment of the instant invention and shows the location of edge reflector at rest.
Figure 10:
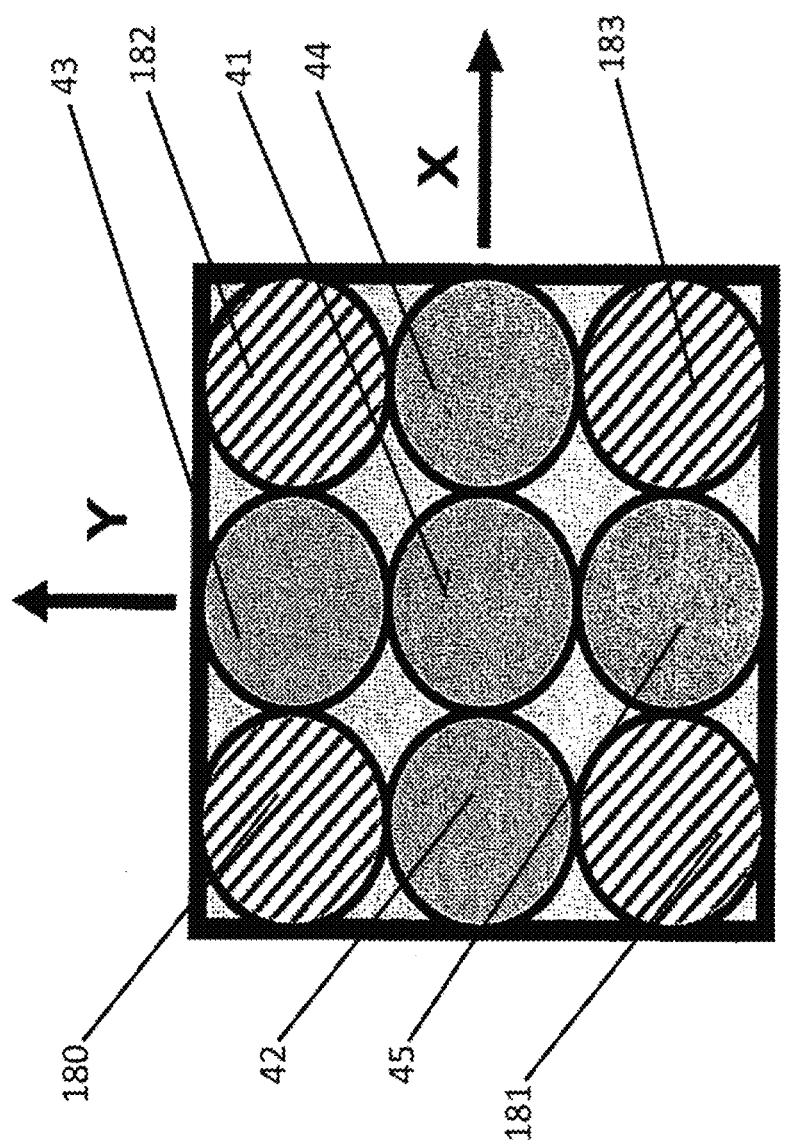
FIG. 10 is a cross-sectional view of a close-packed fiber optic probe according to an embodiment of the invention.

Optionally, the at least one receiving multimode optical fiber 42 includes four receiving multimode optical fibers 42, 43, 44, 45, for example as shown by way of illustration in FIG. 4B. The four receiving multimode optical fibers 43, 43, 44, 45 includes two pairs of opposing receiving multimode optical fibers. Optionally, the fiber optic acoustic sensor further includes a plurality of solid rods 80, 81, 82, 83 located between adjacent receiving multimode optical fibers of the four receiving multimode optical fibers 42, 43, 44, 45. Optionally, the fiber optic acoustic sensor further includes a plurality of dummy optical fibers 180, 181, 182, 183 located between adjacent receiving multimode optical fibers of the four receiving multimode optical fibers 42, 43, 44, 45, for example, as shown in FIG. 10.

Figure 4C:
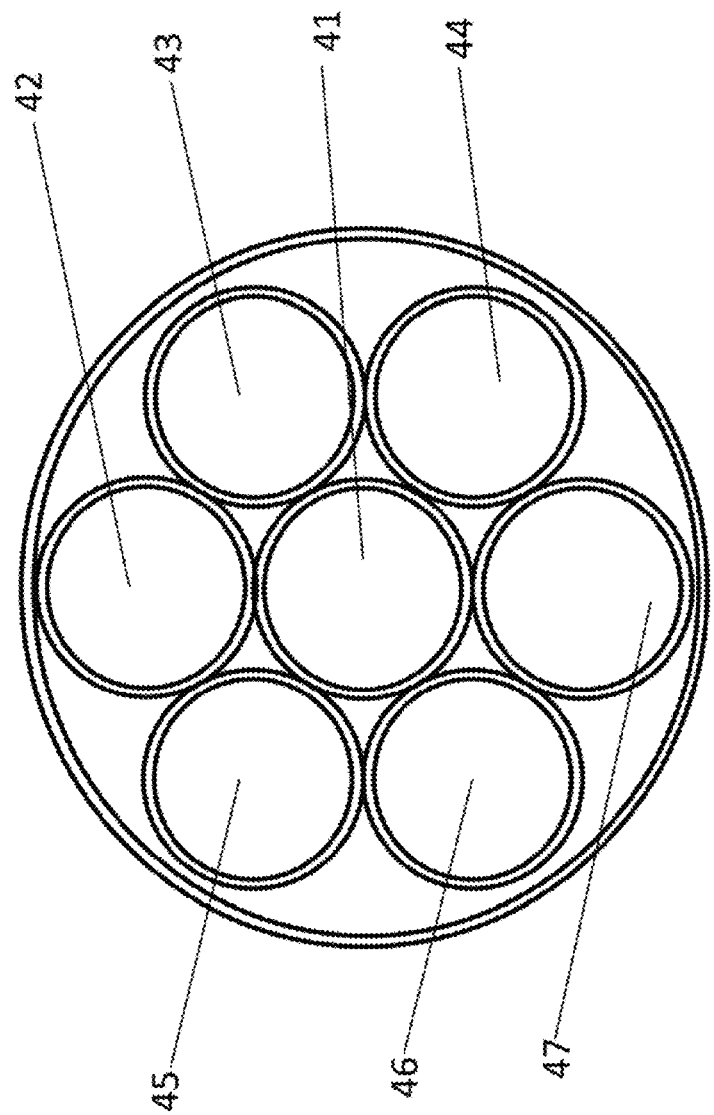
FIG. 4C is a cross-section of a seven-fiber probe according to an embodiment of the instant invention and does not show the location of the edge reflector at rest for ease of understanding.

Optionally, the at least one receiving multimode optical fiber 42 includes six receiving multimode optical fibers 42, 43, 44, 45, 46, 47, for example as shown by way of illustration in FIG. 4C. The six receiving multimode optical fibers 42, 43, 44, 45, 46, 47 include three pairs of opposing receiving multimode optical fibers.

Optionally, the fiber optic probe 40 includes a probe end. The fiber optic acoustic sensor further includes a casing 90 enclosing the probe end and the cantilever rod 51, for example as shown by way of illustration in FIG. 1B. Optionally, the casing 90 includes a plastic material. Optionally, the casing 90 includes a fill liquid 100 surrounding the probe end and the cantilever rod 51. Optionally, an acceptable fill fluid 100 is determined as follows. A desired value for the fill fluid viscosity q is determined by using Equations (2), (7) (9), (10), and (11) discussed below with respect to the analytic solution developed for predicting the acoustically induced displacement of the cantilever end, $X(\Omega)$. Two forces act on the cantilever: 1) an acoustic pressure gradient force, which is proportional to frequency, and 2) an acoustic viscous flow force, which is independent of frequency. From Equation (5), fill fluid viscosity $\eta$ must be high enough (compared to the external fluid, e.g., water) and the cantilever radius a low enough so that the acoustic viscous flow force dominates over the acoustic pressure gradient force. Then, a cantilever length l is chosen. A response is computed, while changing the viscosity and length until the response is flat over a range of frequencies until the resonance is approached. The resonance is also controlled by the same parameters, mainly cantilever radius a and cantilever length l. For example, the fill fluid 100 includes a glycerin solution, an ethylene glycol solution, or a glycerin-water solution. The illustrative choices of the glycerin-water solution or the ethylene glycol solution, for example, were selected for use with an illustrative cantilever having a 1.5 cm cantilever length and a 118 μm diameter aluminum-jacketed fiber used in an illustrative cantilever. This illustrative cantilever essentially required a fill fluid viscosity of 0.01 Poise, which is very close to that of a 60% by weight water-glycerin solution ($\eta=0.0108$ P) or of a pure ethylene glycol solution ($\eta=0.016$ P). In general, the desired fill-fluid parameters are roughly independent of the external fluid. Optionally, the material of the casing 90 has an acoustic impedance proximate to a product of a density of fluid external to the casing and a speed of sound in the fluid external to the casing. Optionally, the thickness of the casing material is much smaller than the wavelength of the external fluid wave.

Figure 2A:
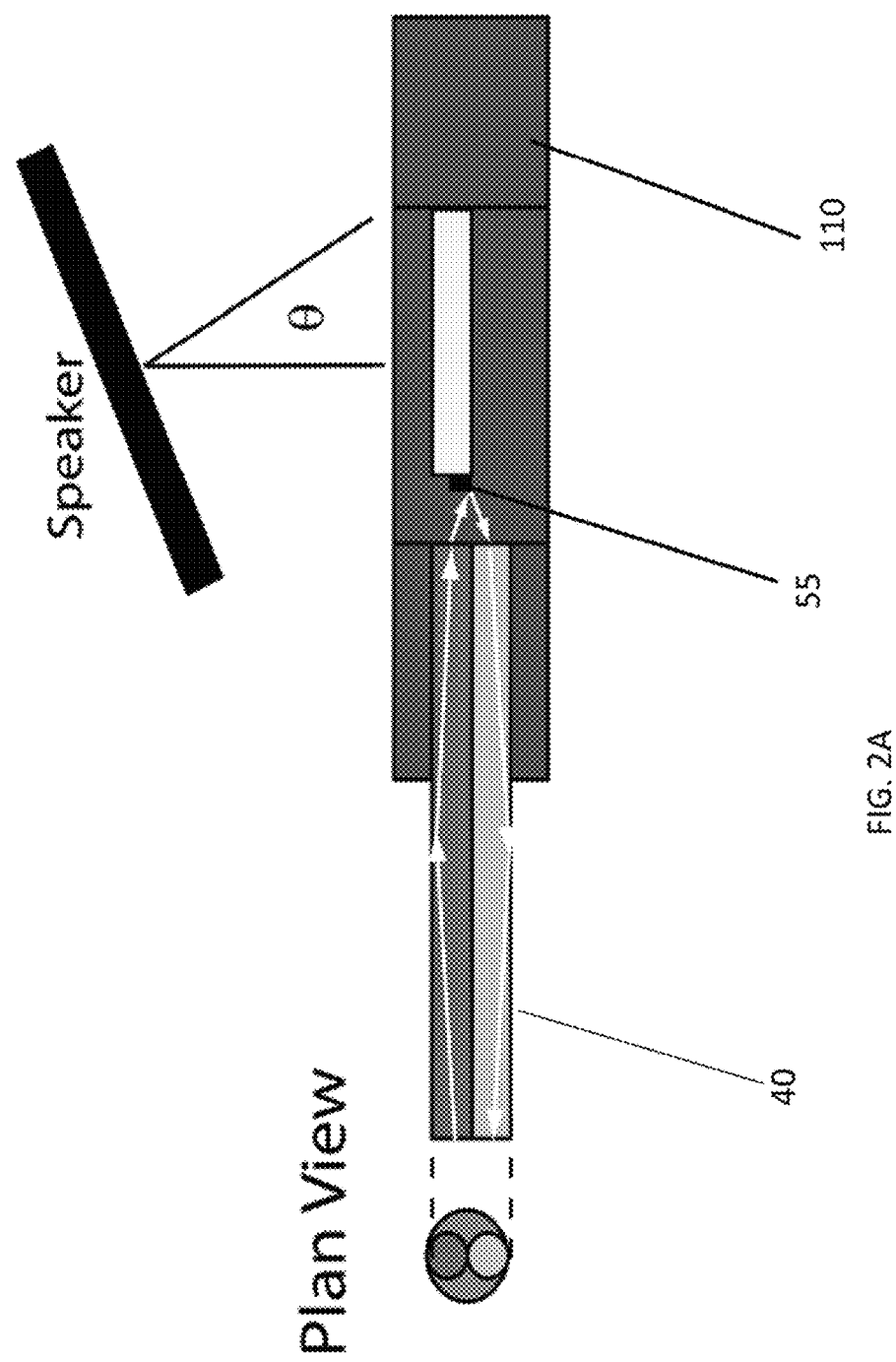
FIG. 2A is a plan view of an alternative optical probe according to an embodiment of the invention, wherein a solid cylindrical material forms the cantilever with its edge reflector on its end face and wherein a casing encloses both the probe and the edge reflector on the cantilever.
Figure 2B:
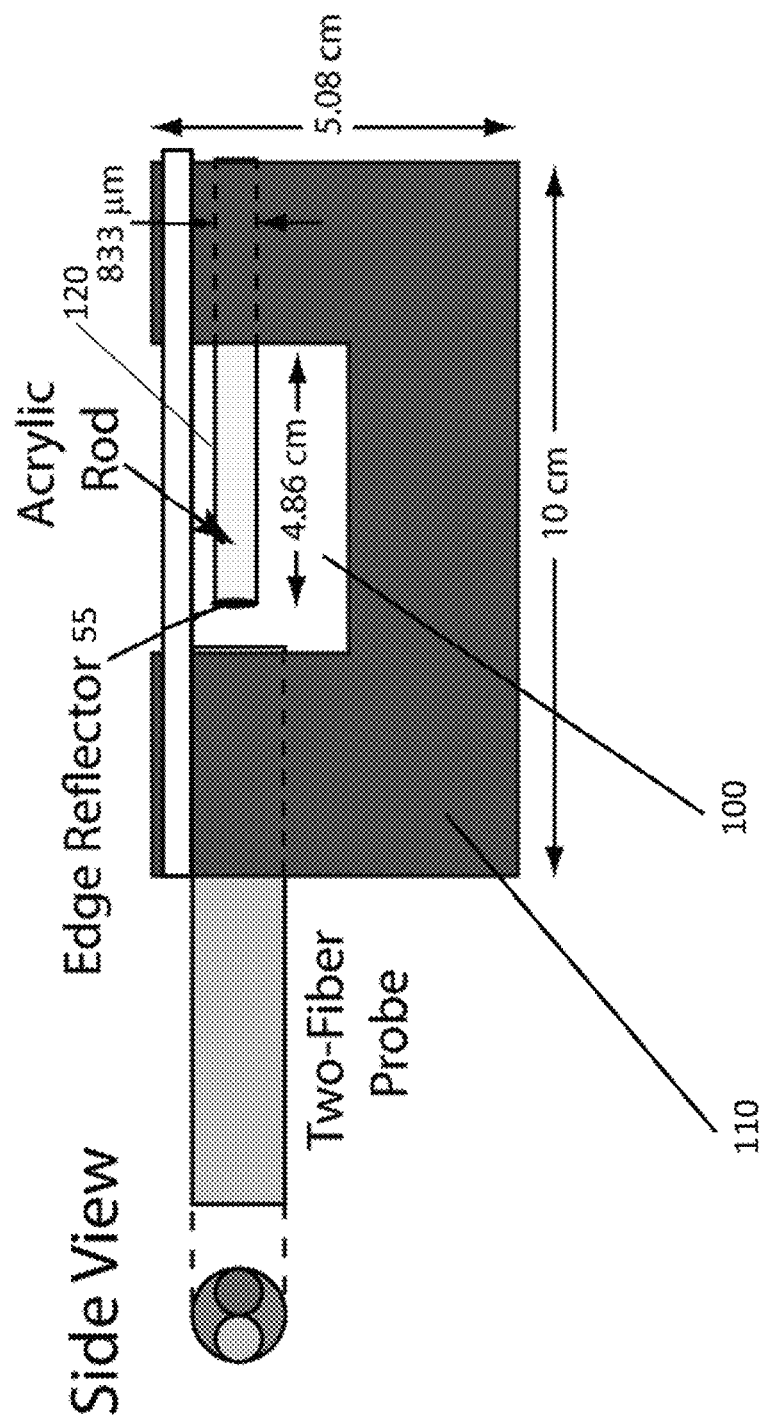
FIG. 2B is a side view of an alternative optical probe according to an embodiment of the invention, wherein a solid cylindrical material forms the cantilever with its edge reflector on its end face and wherein a casing encloses both the probe and the edge reflector on the cantilever.

Optionally, the casing 90 includes a fill liquid 100 surrounding the probe end and the cantilever rod 51, for example, as shown by way of illustration in FIGS. 2A and 2B. The cantilever rod 51 includes a distal end. The fiber optic acoustic sensor further includes a cantilever mount 95 connected to the distal end of the cantilever rod 95, and a boot 110. The fiber optic probe 40 and the cantilever mount 95 are connected to the boot 110. Optionally, the fill fluid 100 includes a glycerin solution, an ethylene glycol solution, or a glycerin-water solution. Optionally, the boot 100 includes a rubber material or a biaxially-oriented polyethylene terephthalate film material.

Selected components of the instant invention will depend on the parameters required for a desired application. For example, the transmitting multimode optical fiber 41 and the at least one receiving multimode optical fiber 42 include multi-mode, step-index optical fibers that have a large numerical aperture (e.g., 0.37), a 15 μm plastic cladding, and a 200 μm glass core. For example, the standard LED (e.g., Optek model OPF370A, Carrolton, Tex. 75006) has a wavelength of 850 nm. For example, the standard light intensity detector is a silicon PIN photo-diode (e.g., Advanced Photonix, Inc., model SD 100-41-21-231, Camarillo, Calif. 93012 or a Terrahertz Technologies, model 71A-500, Oriskany, N.Y. 13424). For example, the standard light source is driven by a standard power supply (e.g., ILX Lightwave Corporation, model LDX-3620, Bozeman, Mont. 59771, which is optionally operated in battery operation mode, a standard battery, or a standard dc power supply manufactured by Acopian Technical Company, Easton, Pa.). For example, the output of the detector is stored, analyzed, or displayed via a standard analyzer (e.g., Agilent Technologies, Hewlett Packard model 3582A spectrum analyzer, Loveland, Colo. 80537).

Another embodiment of the invention includes a method of measuring particle velocity in an acoustic wave or a pressure gradient of the acoustic wave using a fiber optic acoustic sensor. The fiber optic acoustic sensor includes a light emitting diode 20. The fiber optic sensor includes a fiber optic probe 40, which includes a transmitting multimode optical fiber 41 and at least one receiving multimode optical fiber 42. The transmitting multimode optical fiber 41 and the at least one receiving multimode optical fiber 42 is substantially parallel to a longitudinal axis of the fiber optic probe 40. The fiber optic probe 40 communicates with the light emitting diode 20. The fiber optic acoustic sensor includes a cantilever 50 including a cantilever rod 51. The cantilever rod 51 includes a proximal end with an edge reflector 55 located thereon. The edge reflector 55 is spaced apart from the fiber optic probe 40 and oriented to face the fiber optic probe. The edge reflector 55 is able to move in a direction substantially perpendicular to the longitudinal axis of the fiber optic probe 40. The fiber optic acoustic sensor includes a light intensity detector 60 communicating with the fiber optic probe 40. In operation, the transmitting multimode optical fiber 41 transmits light from the light emitting diode 20 toward the edge reflector 55. The edge reflector 55 reflects at least a portion of the light toward the at least one receiving multimode optical fiber 42. An amount of light received by the at least one receiving multimode optical fiber 42 indicates a relative displacement of the edge reflector 55 with respect to the fiber optic probe 40 in a direction perpendicular to the longitudinal axis of the fiber optic probe. The method is practiced as follows. The fiber optic acoustic sensor is located in an external fluid. Particle excitation in the external fluid is detected using the fiber optic acoustic sensor. Velocity in at least an X-direction of a source of the particle excitation is determined, based in part on the amount of light received by the receiving multimode optical fiber.

Optionally, the determining velocity in at least an X-direction of the particle excitation includes determining velocity in an X direction of the particle excitation and velocity in a Y-direction of the particle excitation. The at least one receiving multimode optical includes four receiving multimode optical fibers, the four receiving multimode optical fibers including two pairs of opposing receiving multimode optical fibers.

Optionally, the determining velocity in at least an X-direction of the particle excitation includes determining velocity in an X direction of the particle excitation, velocity in a Y-direction of the particle excitation, and velocity in a Z-direction of the particle excitation, wherein the at least one receiving multimode optical includes six receiving multimode optical fibers, the six receiving multimode optical fibers including three pairs of opposing receiving multimode optical fibers.

Optionally, the fiber optic probe includes a probe end, wherein the fiber optic acoustic sensor further includes a casing enclosing the probe end and the cantilever rod, the casing including a fill liquid surrounding the probe end and the cantilever rod. Optionally, the fill fluid includes one of a glycerin solution, an ethylene glycol solution, and a glycerin-water solution. Optionally, the casing includes a fill liquid surrounding the probe end and the cantilever rod, the fill fluid including one of a glycerin solution, an ethylene glycol solution, and a glycerin-water solution, wherein the cantilever rod includes a distal end, wherein the fiber optic acoustic sensor further includes a cantilever mount connected to the distal end of the cantilever rod, and a boot, the fiber optic probe and the cantilever mount being connected to the boot.

Alternative embodiments of the instant invention are explained as follows. First, the displacement sensitivity of a 2-fiber optic probe with an edge reflector is considered. Next, a fiber optic acoustic receiver based on the 2-fiber optic probe with an edge reflector is considered. Then, a directional fiber optic acoustic receiver which utilizes a 3-fiber optic probe with a strip symmetrical reflector is considered. Finally, an x-y directional fiber optic acoustic receiver using a 5-fiber probe and a square edge reflector, and an x-y-z directional fiber optic acoustic receiver using a 7-fiber probe and an edge reflector are considered.

A) 2 Fiber Probe with Edge Reflector

In the 2 fiber probe with an edge reflector (such as shown, for example in FIGS. 1B, 2A and 2B), light from a LED coupled into a multimode transmitting fiber propagates to the well polished end of the fiber where it leaves the fiber and is reflected back by an edge reflector closely located to the fiber end. Part of the reflected light is coupled into the receiving fiber and is detected by a PIN detector.

A1) Directional Acoustic Sensor Concept.

Figure 1B:
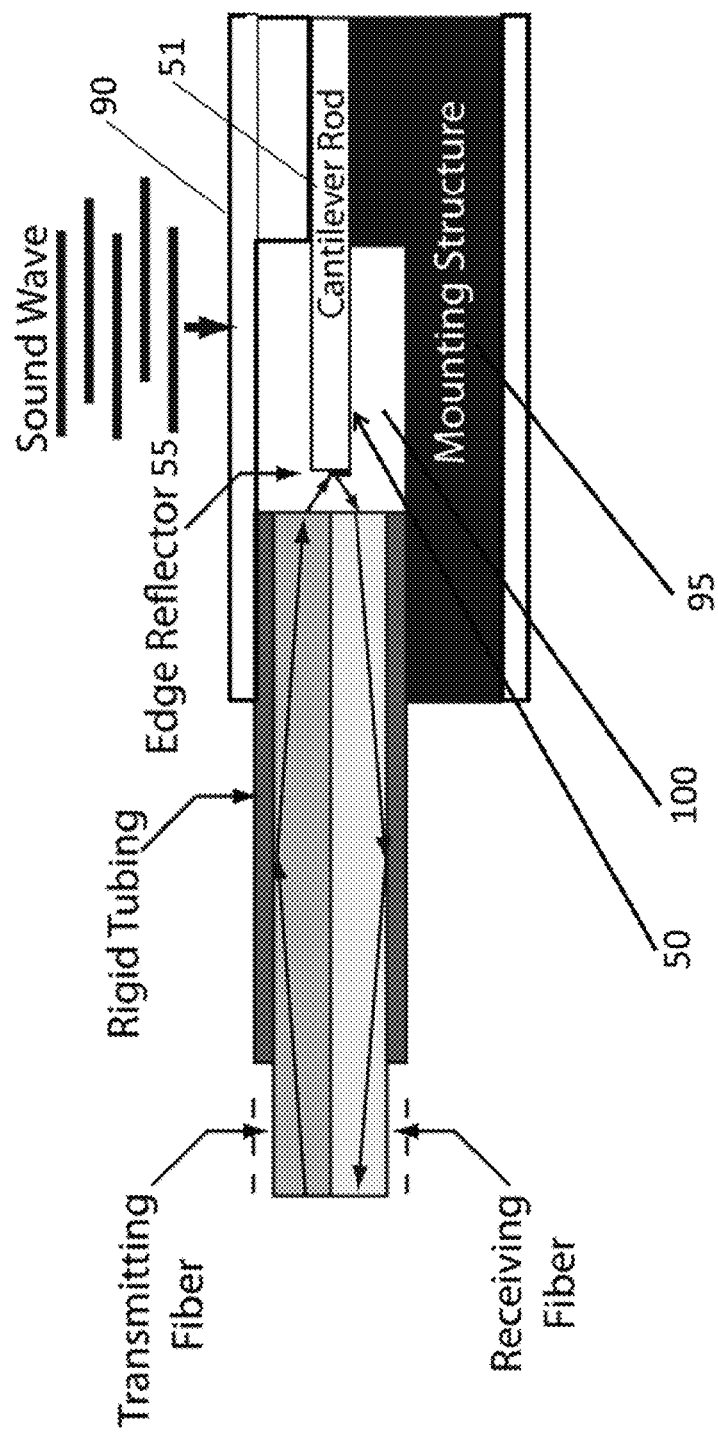
FIG. 1B is a side view of a two-fiber probe and a cantilever rod with an edge reflector mounted on its end face according to an embodiment of the instant invention.

FIGS. 1A and 1B show a diagram of the overall directional sensor concept and a side view of a two-fiber probe and a cantilever with an edge reflector according to an embodiment of the invention. As can be seen in FIG. 1B, one fiber of a two-fiber probe is used to direct light onto the end of a slender cantilever rod to which is fixed an edge reflector. Light reflected from the edge reflector is collected by the second fiber and carried back to a photo-detector. Acoustically induced transverse movement of the cantilever rod modulates the position of the edge reflector changing the amount of reflected light re-captured by the second fiber. As discussed above, the two-fiber probe used in embodiments of the invention advantageously use the two-fiber probe taught in U.S. Pat. No. 7,792,395 to Lagakos et al. In the acoustic sensor, directionality is achieved through the fact that the light level change in the return fiber is proportional to cos (θ), where θ is the angle between a line through the centers of the two fibers and the cantilever tip displacement direction in the (x,y) plane, as shown by way of illustration in FIGS. 3A and 3B. The cantilever tip displacement, in turn, is in the direction of the acoustic wave.

Figure 3A:
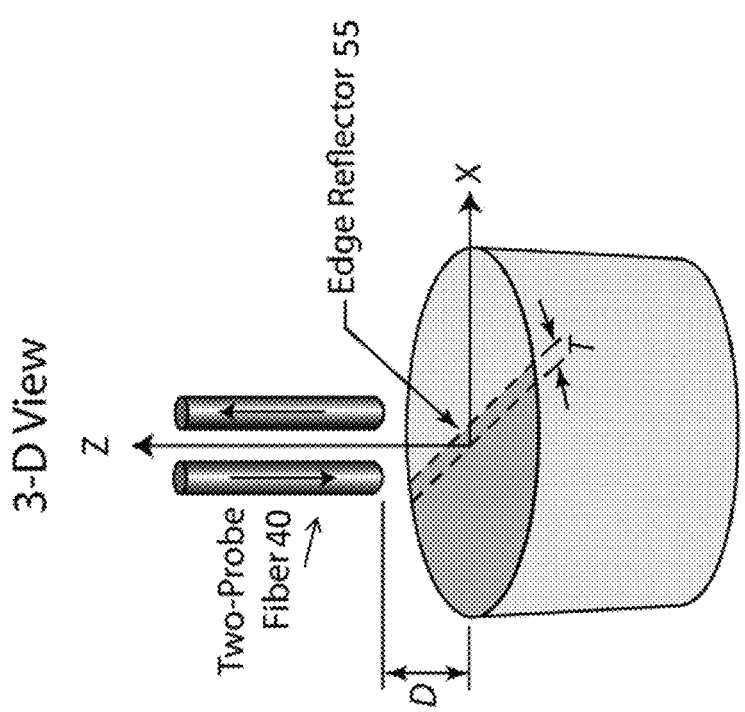
FIG. 3A is a perspective view of a two-fiber probe according to an embodiment of the instant invention and shows transmitting and receiving fibers, the normal gap distance D, the edge reflector, its operating position $X_{eo}$, and the angle $\theta$ in the (x,y) plane between the cantilever tip displacement X and the x axis.
Figure 3B:
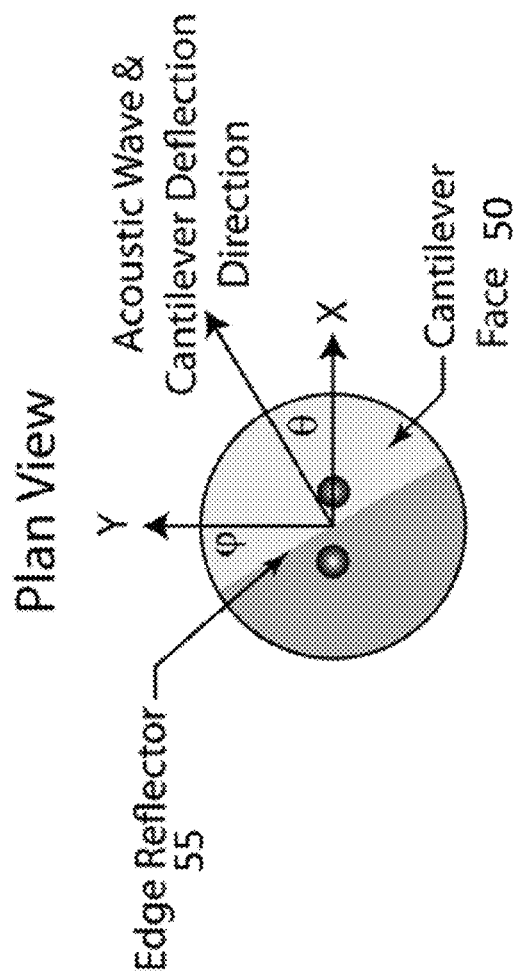
FIG. 3B is a plan view of a two-fiber probe to an embodiment of the instant invention and shows misalignment of the edge reflector by an angle $\phi$ between the x axis and the reflector's edge.

In a cantilever-based acoustic sensor according to the instant invention, directionality is achieved through the fact that the light level change in the return fiber is proportional to cos (θ), where θ is the angle between a line through the centers of the two fibers (the x axis) and the cantilever tip displacement direction (in the x-y plane) which, in turn, is in the direction of the acoustic wave, as shown in FIGS. 3A and 3B.

To predict the sensitivity of the cantilever-based acoustic sensor, one must determine the change in optical power in the receiving fiber per unit of acoustic pressure acting on the cantilever. This coefficient, in turn, is given by the product of two factors, $\partial W_{op}/\partial X$ and $\partial X/\partial P$, i.e., the change in received optical power with transverse mirror displacement, X, and the change in transverse mirror displacement with acoustic pressure, P.

In FIGS. 3A and 3B, φ and θ have the following meaning:

$\varphi$ – misalignment angle between reflector edge and $Y$ direction $\theta$ – angle between acoustic wave direction and $X$ direction $$\left(\frac{\partial W_{op}}{\partial X}\right)_\varphi = \left(\frac{\partial W_{op}}{\partial X}\right)_{\varphi=0°} \cos\varphi$$

$$\left(\frac{\partial W_{op}}{\partial Y}\right)_\varphi = \left(\frac{\partial W_{op}}{\partial Y}\right)_{\varphi=90°} \sin\varphi$$

The equations are valid for small angles of misalignment, φ, an embodiment of the instant invention. For the purposes of this specification, "small angles of misalignment" are understood to mean on the order of several degrees, e.g., 5-10°.

The cross section of a five-fiber probe which could also be used in the directional acoustic sensor is shown in FIG. 4B along with that for the two fiber probe. In the five-fiber design, the central fiber carries the probing optical beam while the horizontal and vertical fiber pairs surrounding it are used to collect the light returning from the reflector. Such a five-fiber probe is attractive in that its horizontal and vertical receiving fiber pairs could be used separately for sensing in two orthogonal directions. FIG. 4C shows a seven fiber probe used in an omni-directional microphone design. All three fiber optic probes 40 use, for example, the same optical fibers.

In an embodiment of the invention, a design using a solid rod as the cantilever is attractive for the many choices one has regarding its elastic properties and other physical parameters. Alternatively, making the five-fiber probe the cantilever appears to simplify the mechanical design and implementation of the edge reflector. In either case, an acoustic wave, which through a vector quantity associated with the wave—e.g. force, displacement, etc.—is able to move the cantilever in the direction of propagation, alters the amount of light returned to the receiving fiber(s) thus yielding a corresponding directional acoustic sensor.

To predict the sensitivity of the cantilever acoustic sensor, one must determine the change in optical power in the receiving fiber per unit of acoustic pressure acting on the cantilever. This coefficient, in turn, is given by the product of two factors, $\partial W_{op}/\partial X$ and $\partial X/\partial P$, i.e. the change in received optical power with transverse mirror displacement, X and the change in transverse mirror displacement with acoustic pressure, P. It is possible to compute $\partial X/\partial P$ analytically and determine $\partial W_{op}/\partial X$ experimentally.

A2) Equal Power Illumination Model.

Figure 5:
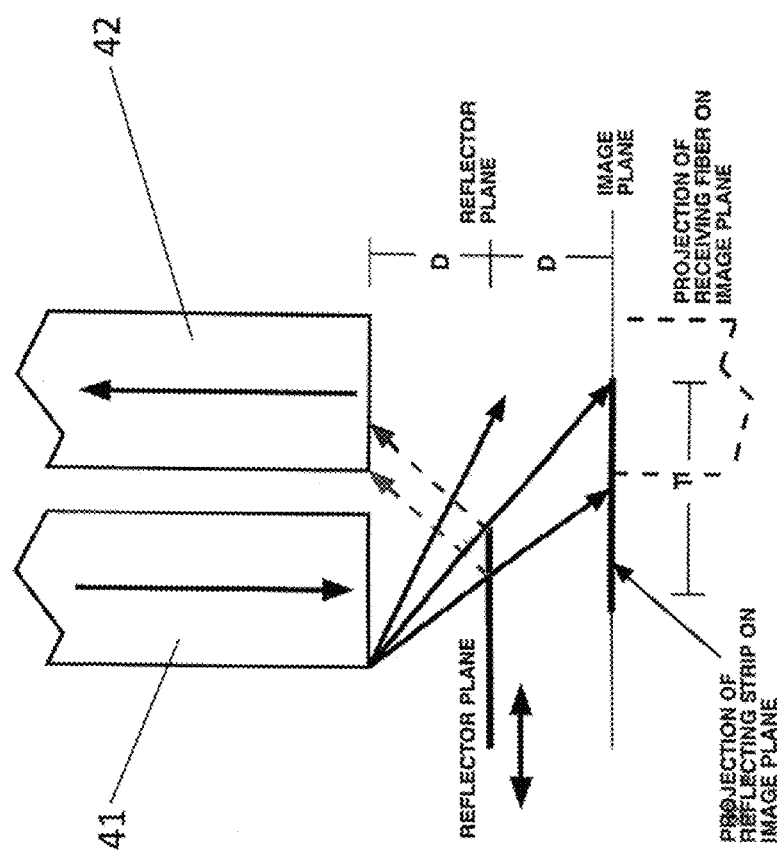
FIG. 5 is a schematic of an image plane view according to an embodiment of the invention.

In the reflection fiber optic sensor described here, light from a LED coupled into the transmitting fiber propagates to the well polished fiber end, leaves the fiber, and is reflected back into a receiving fiber by a reflecting surface closely located to the fiber end. The equal power model for the reflected light was developed for the case where the reflecting surface is a membrane vibrating normally with respect to the receiving fiber. Here this model is developed for the case shown in FIG. 5 and FIG. 6, where the reflecting surface has a sharp, straight edge, and is vibrating transversely relative to the receiving fiber. The ac output light power from the receiving fiber is proportional to the transverse vibration of the edge of the reflecting surface.

Figure 7:
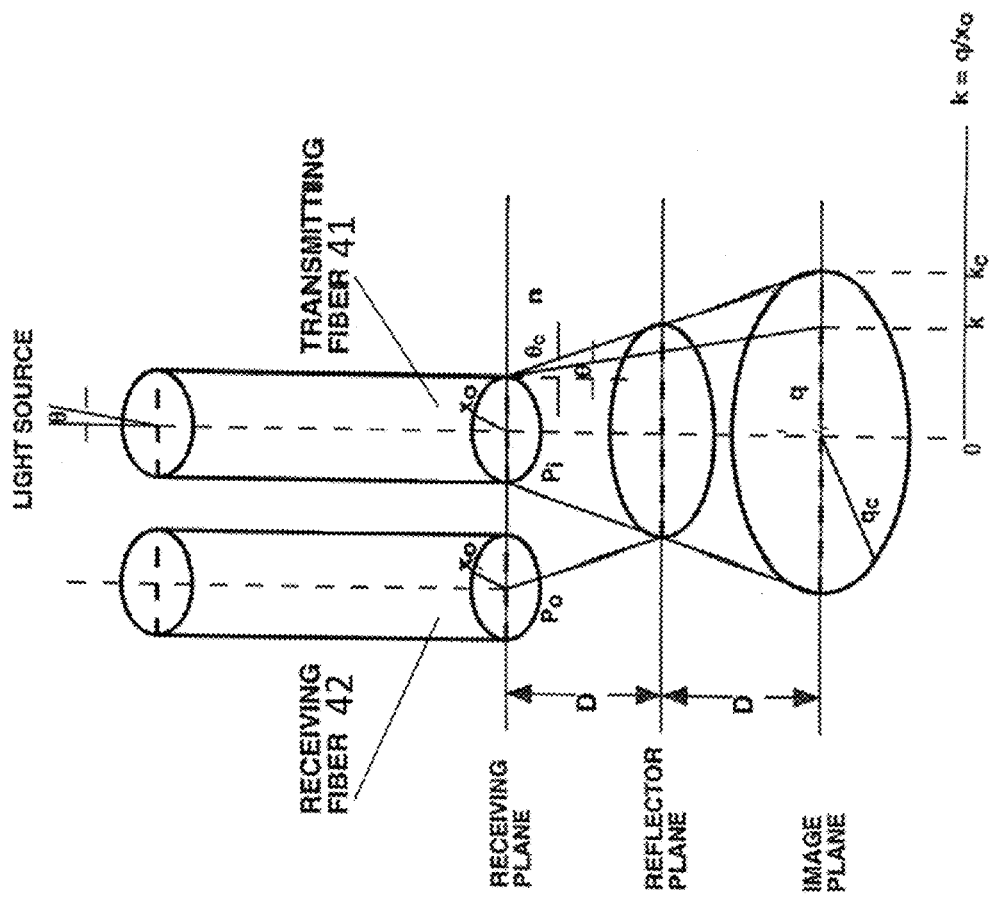
FIG. 7 is a schematic showing coordinates of a two-fiber probe according to an embodiment of the invention.

It is convenient to do the analysis in the image plane, as shown in FIG. 7. Also, it is convenient to define dimensionless distances in the image plane by dividing actual distances by the radius $x_0$ of the fiber. In particular define $k=q/x_0$ as a dimensionless coordinate on the image plane, and $m=2+2c_m/x_0$ is the dimensionless distance between the center of the transmitting fiber and the center of the receiving fiber. Other important parameters are Pi, the total optical power exiting the transmitting fiber, and Po, the optical power reflected back into the receiving fiber.

To determine the optical power Po it is necessary to calculate the intensity $I_k$, defined as the reflected optical power per unit area at location k on the receiving fiber. Expressions for $I_k$, as function of the distance D between the fiber bundle and the reflecting surface, have been derived in U.S. Pat. No. 7,460,740, which is incorporated herein by reference.

The received power Po is determined by the location, $tx_o$, of the edge of the reflecting surface. Po is calculated by integrating $I_k$ over the dark arc elements shown in FIG. 6. (In this figure the incident light outside the reflecting strip edge does not give any contribution). The following expression was derived for the normalized reflected light power, Po/Pi=A+B, where A and B are:

$$A = (2/\pi) \int_{m-1}^{t} I'_k \sigma_1 k_1 \, dk_1$$

-continued $$B = (2/\pi)\int_{t}^{(1-m^2+2mt)^{1/2}} I'_k \sigma_2 k_2\, dk_2$$

where $I_k'$ is the normalized intensity, $I_k'=I_k/Io$, and Io is the light intensity exiting the transmitting fiber, $Io=Pi/(\pi x_o^2)$. Also, $$\sigma_1=\theta_1=\cos^{-1}[(k_1^2+m^2-1)/(2k_1 m)]$$

and $$\sigma_2=\theta_2-\theta$$

where $\theta=\cos^{-1}(t/k_2)$, $\theta_2=\cos^{-1}[(k_2^2+m^2-1)/(2k_2 m)]$

Figure 6:
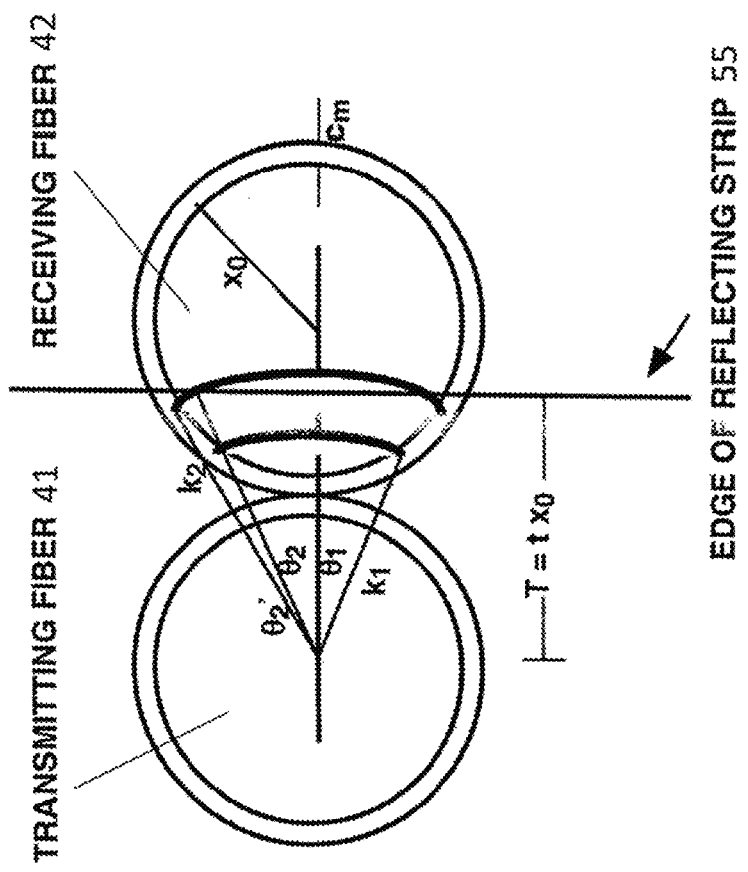
FIG. 6 is a schematic of a motion plane view according to an embodiment of the invention.

The parameters $k_1$, $k_2$, $\theta_1$, $\theta_2$ and t are shown in FIG. 6.

A program in MATLAB can be written to calculate Po/Pi as a function of $T=tx_0$. The above integrals can be evaluated numerically in such a program. The plot of Po versus T gives the static (dc) response of the fiber optic sensor. The derivative, $\partial Po/\partial T$, is the ac response to transverse vibration of the edge.

B) Fiber Optic Directional Acoustic Sensor

B1) Acoustic Pressure Response Calculations.

To predict the optical intensity modulation due to an incident acoustic wave $(\partial X/\partial P)$ for the cantilever-fiber probe device, one needs to determine the transverse displacement of the cantilever tip in response to the acoustic wave, and then combine this result with the measured coefficient describing the change in light level in the receiving fiber per unit cantilever displacement $(\partial W_{op}/\partial X)$ reported previously.

Figure 8:
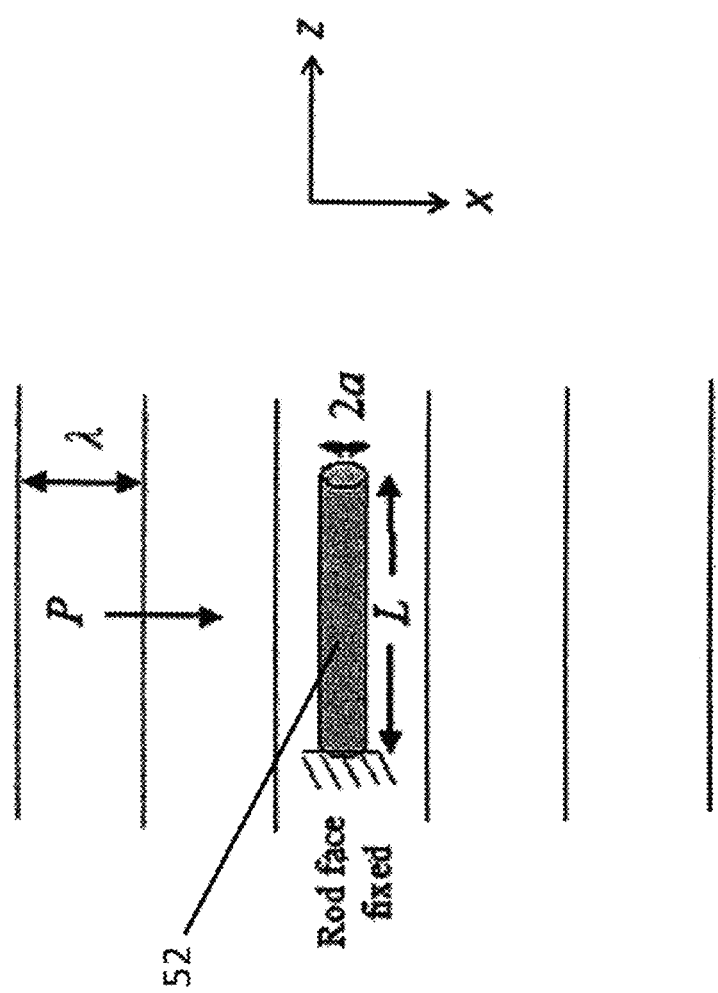
FIG. 8 is a schematic of the geometry used for development of the analytic model for predicting the cantilever tip displacement in response to a plane acoustic wave traveling in the x direction.

FIG. 8 depicts a simple geometry to be considered. The cantilever is a solid cylindrical rod of length L and diameter $2a$ made from material of density $\rho$ and Young's modulus E aligned along the z axis, held rigidly at one end, and immersed in a fluid with sound speed $C_W$ and density $\rho_W$. It is insonified by an acoustic plane wave with pressure amplitude P and wavelength $\lambda$ traveling in the x direction. Determination of the acoustically induced cantilever tip displacement begins with the harmonic oscillator lumped parameter differential equation for the transverse end displacement X of the cantilever given by $$\partial X^2/\partial t^2 + 2\xi\omega \partial X/\partial t + \omega^2 X = F/m_e \cos(\Omega t) \quad (1)$$

where $m_e$ is the effective mass of the cantilever, $\omega$ is the natural cantilever resonance frequency, $\xi\omega=\gamma$ is the damping factor, F is the net acoustic force acting on the cantilever, and X is the acoustic radial frequency. The solution is the well-known expression:

$$|X(\Omega)|=F/m_e((\omega^2-\Omega^2)^2+4\gamma^2\Omega^2)^{-1/2}. \quad (2)$$

Suitable expressions for F, c, m, and $\omega$ must be determined that take into account the distributed nature of the acoustic force and the cantilever mass.

The forces acting on the fiber are approximated as theسum of the pressure gradient force and the flow or drag force. The net pressure gradient force acting on the fiber per unit length, $F_{Grad}/L$, found by integration of the component of force in the direction of the wave over the circumference, can be approximated by $F_{Grad}/L \sim (\partial P/\partial x)\pi a^2$ giving $$F_{Grad}/L=i(\Omega/C_W)P\pi a^2. \quad (3)$$

The drag force associated with the acoustic flow can be determined using the standard expression for the drag force due to flow past a cylinder $F_{F1}$ given by $$F_1=4\pi\eta b L v, \quad (4)$$

where v is the flow velocity, $\eta$ is the viscosity of the fluid, and b varies depending upon the proximity of the enclosure boundaries to the cantilever. (In cases where these boundaries are at a distance at least ten times, the rod diameter, $b \leq 0.5$, and this value (0.5) is used for estimates which follow later.) Taking v as the relative velocity between the fluid particle motion given by $P/\rho_W C_W$ and the cantilever tip velocity given by $\Omega X$, moving the term associated with the latter to the left-hand side of Eq. (1), and noting that $F_{Grad}$ and $F_1$ are 90° out-of-phase, the total force magnitude is $$F/P=(F_{Grad}+F_{F1})/P=\pi\Omega a^2 L C_W^{-1}[1+(4\eta b a^{-2}\rho_W^{-1}\Omega^{-1})^2]^{1/2}. \quad (5)$$

A standard expression for the resonance radial frequency x based on the rod normal mode frequencies for the lowest mode is $$\omega \sim 1.74 a/L^2 [E/\rho]^{1/2}. \quad (6)$$

One can use this expression to determine the effective mass, $m_e$, recognizing that the effective spring constant k for a cantilever rod driven by a force evenly distributed along its length is 8/3 that for one forced at its end so that $k=2\pi E a^4/L^3$. Combining this with Eq. (6) gives $$m_e=k/\omega^2=2\pi/1.74^2 a^2 L \rho. \quad (7)$$

The damping factor, $\gamma=\xi\omega$, can be estimated by assuming that at the low frequencies of interest here, damping is given by the sum of acoustic radiation damping $\gamma_{rad}$, the damping associated with viscous drag forces $\gamma_\eta$, and the cantilever attachment loss $\gamma_{att}$. Using a standard Fourier series solution for the radiation impedance of a finite cylinder, at low frequencies, one gets $$2\gamma_{rad} m_e = -\pi/8 \rho_W C_W (ka)^3. \quad (8)$$

Inserting $m_e$ from Eq. (7) gives $$\gamma_{rad}=1.74^2/32\Omega^3 C_W^{-2} a L^{-1} \rho_W/(\rho+\rho_W). \quad (9)$$

Here the factor $\rho_W$ has been included in the denominator as a result of having added to the mass of the rod the radiation impedance mass calculated from evaluating the imaginary part of the acoustic impedance for $ka \ll 1$ obtained from $$2m_e\gamma_{rad}/A = 2\xi\omega/A = \text{Re}: i\pi/2aL^2\rho_W\Omega(H_1(ka)/kLH_1'(ka)) \quad (A1)$$

$$= \text{Re}: iA/2\rho_W C_W[(J_1(ka)+iN_1(ka)/(J_0(ka)+iN_0(ka)-(J_1(ka)+iN_1(ka))/ka)],$$

where A is the cylindrical rod surface area, and $H_n$, $I_n$, and $N_n$ are the Hankel, Bessel, and Neumann functions of order n. At resonance, the mass is the sum of the rod mass m and the radiation mass $m_{rad}$, where the latter is given by one over the imaginary part of the acoustic admittance divided by $\Omega$. This gives the low frequency approximation $m_{rad}=\pi a^2 L \rho_W$. Equation (6) for the fluid loaded rod then becomes $$\omega \sim 1.74 a/L^2 [E/(\rho+\rho_W)]^{1/2}. \quad (10)$$

The damping associated with the viscous flow forces can be determined from the expression for the drag force $F_{F1}$ given by Eq. (4) leading to $$\gamma_\eta=2(1.74)^2\eta b/(a^2\rho). \quad (11)$$

Adding the radiation, viscous, and attachment losses together, the second term on the left-hand side in Eq. (1) becomes $$2\xi\omega \partial X/\partial t = 2(\gamma_{rad}+\gamma_\eta+\gamma_{att})\partial X/\partial t. \quad (12)$$

Equations (2), (7), (9), (10), and (11) together with an empirical value for the attachment loss can now be used to determine the acoustically induced displacement of the cantilever end $X(\Omega)$.

The primary interest here is a directional sensor, which, taking advantage of the very low 1/f noise associated with the optical probe, can operate at very low frequencies. The response of the cantilever at low frequencies where $\Omega/\omega \ll 1$ can be found from Eqs. (2), (5), (6), and (7) to be given approximately as $$X(\Omega)/P \sim L^4[\Omega^2+(4\eta b a^{-2} \rho_W^{-1})^2]^{1/2}/(2C_W E a^2). \qquad (13)$$

As can be seen from Eq. (13), at low frequencies significant increases in sensitivity can be obtained (in order of decreasing impact) by increasing the cantilever length, decreasing its diameter, or using a less stiff material. It is also noted that as one continues to lower the frequency, the flow or drag term provides a modest response level independent of frequency even as the gradient pressure term which is proportional to $\Omega$ tends to zero. This makes embodiment of the instant invention useful, for example, as a very low frequency or infrasonic sensor.

The effect of flow (drag) forces were examined using the analytic result, by graphing the acoustic flow (drag) force and the gradient force versus frequency for the same acrylic cantilever. Only radiation damping and viscous loss were included in $\gamma$. The acoustic flow force is considerably less than the applied acoustic gradient force across the band of interest except at frequencies below about 5 Hz in water and 50 Hz in air. While this is also not the case for water in the vicinity of the cantilever resonance, additional damping would also eliminate this exception. Accordingly, neglect of flow-related force away from the resonance appears to be justified except at the very low frequencies. Further, at these very low frequencies there is an increased displacement response due to the contribution from the acoustic flow force. The model predicts that below about 1 Hz in water and 10 Hz in air, the cantilever is changing from a gradient pressure sensor to a velocity sensor. As the acoustic particle velocity is independent of frequency, when this occurs the sensitivity no longer decreases as the frequency is lowered.

Although the viscosity of air is only 2% that of water, particle velocities are three orders of magnitude higher, so that the flow force in air would be about 79 times greater than that in water. At a given frequency, the gradient force would be higher in air than in water by only a factor of 4 (i.e., the sound speed ratio). Thus, in air the frequency below which the flow force is important is higher than it is in water.

The situation for frequencies somewhat higher than the first cantilever resonance (but still sufficiently lower than the second) is quite opposite from that at low frequencies. In this regime, one can show that $$X(\Omega)/P \sim 1.5[\Omega C_W \rho]^{-1}. \qquad (13)$$

Recognizing that the wave particle displacement is $$P/[\rho_W C_W \Omega]^{-1},$$

one finds that for water, the cantilever tip response here is already close to the particle displacement in the acoustic wave so that there is little that can be done to increase the displacement response. However, this is not necessarily the case for air where at the higher frequencies the particle displacements are three orders of magnitude larger than the cantilever tip motion.

C) 3 Fiber Probe with Symmetric Reflector

Figure 9A:
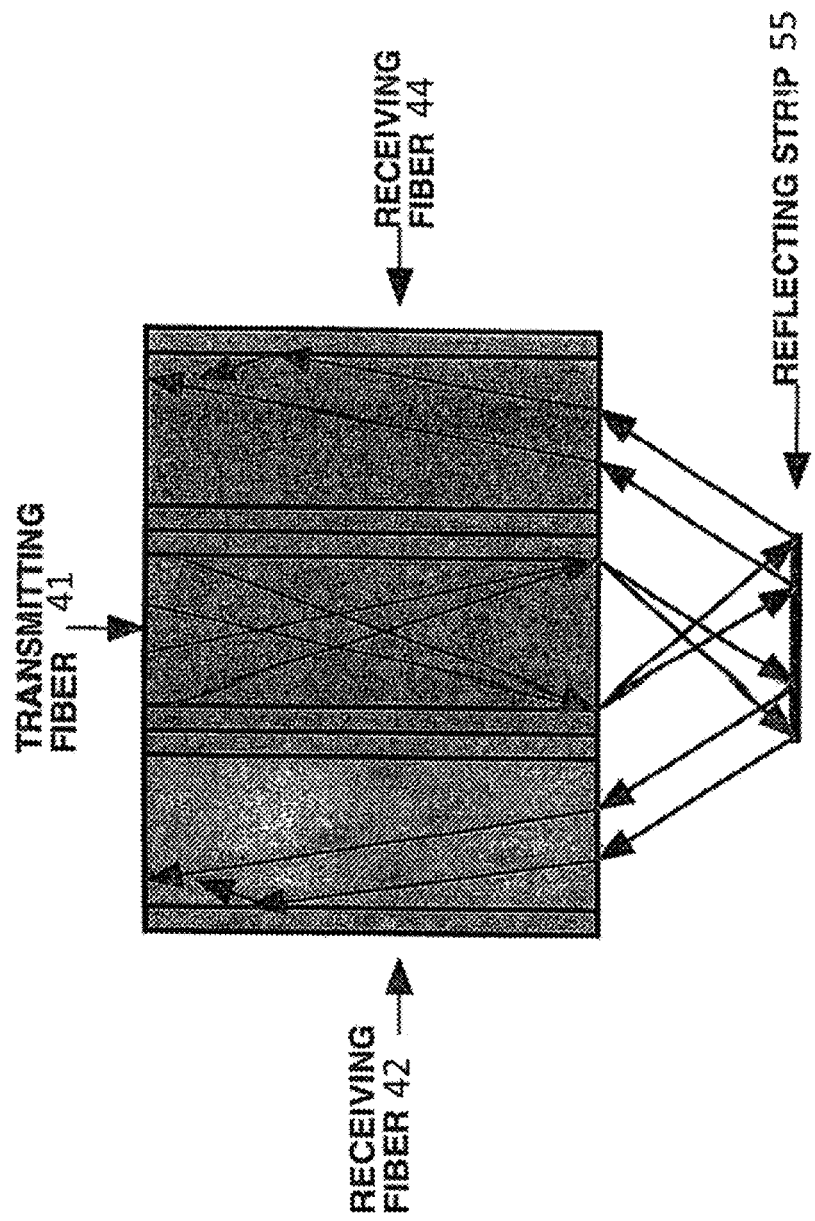
FIG. 9A is a schematic of a motion plane view according to an embodiment of the invention, wherein the fiber optic probe includes more than one receiving fiber.

Another embodiment of the instant invention includes a fiber optic probe, for example as shown in FIGS. 2A, 2B, 9A, and 9B. This embodiment is more complicated, but has a significantly higher signal to noise ratio. In this embodiment, there are two receiving fibers placed diametrically opposite on either side of the transmitting fiber, for example, as shown in FIG. 9A. The reflecting surface is a narrow strip, and the probe is positioned so that the reflecting strip is located symmetrically with respect to the transmitting fiber. It can be seen from the direction of light rays shown in FIG. 9A that each edge of the strip independently determines the reflection of light into the adjacent receiving fiber. Therefore, the light reflected into each fiber is calculated using the model developed for the reflecting surface with a single edge. This is shown in the image plane, in FIG. 9B. From this figure, it can be seen that, by symmetry, for a given small transverse displacement $\delta T$ of the reflecting strip the change, $\delta P_{\theta 1}$, in light power received by fiber 1 is equal in magnitude but opposite in sign to the change in light power, $\delta P_{\theta 2}$, received by fiber 2. Therefore, the ac signals from the receiving fibers are equal in amplitude but opposite in phase. Subtraction of the two signals results in a stronger signal by a factor of 2 with reduced noise. This noise reduction can be very significant and is mainly due to LED and its current source noise reduction and sensor lead noise cancellation.

X-Y Fiber Optic Directional Acoustic Receiver.

The above idea with a symmetric reflector can be extended to 2 axes using the 5 fiber probe shown in FIG. 4B. As can be seen from this figure, there are 3 fibers aligned along the x-axis and 3 fibers aligned along the y-axis. The transmitting fiber is common to both x and y axes, and it is at the center of the fiber probe, while the receiving fibers are symmetrically aligned to both sides of the transmitting fiber. In this sensor, the reflector is not a strip as in FIGS. 9A and 9B, but a small square reflector aligned with the transmitting fiber. As an example, the transmitting and receiving optical fibers have a 200 μm glass core, a 230 μm plastic clad (e.g., SpecTran Specialty Optics Co.'s HCS® Hard Clad Silica), and a 500 μm flourine-based plastic coating (e.g., E.I. du Pont de Nemours and Co.'s Tefzel® ethylene tetrafluroethylene resin) and have a 0.37 numerical aperture.

FIG. 10 shows an x-y fiber probe according to another embodiment of the invention, which has two orthogonal 3-fiber probes. In this case, nine identical optical fibers are used, four of which are dummy fibers. The five remaining optical fibers form two orthogonal probes of three optical fibers each. The probe shown in FIG. 10 is a close-packed optical fiber system similar to the seven fiber system in FIG. 4C.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. A fiber optic acoustic sensor comprising:
  a light emitting diode;
  a fiber optic probe having a probe end, a transmitting multimode optical fiber, and at least one receiving multimode optical fiber, the transmitting multimode optical fiber and the at least one receiving multimode optical fiber being substantially parallel to a longitudinal axis of the probe; said fiber optic probe communicating with said light emitting diode;

a cantilever comprising a cantilever rod, said cantilever rod comprising a proximal end with an edge reflector located thereon, said edge reflector being spaced apart from the fiber optic probe and oriented to face said fiber optic probe, said edge reflector being able to move in a direction substantially perpendicular to the longitudinal axis of the fiber optic probe;

a casing enclosing said probe end and said cantilever rod, said casing comprising a fill liquid surrounding said probe end and said cantilever rod, said fill liquid comprising a fill liquid viscosity such that an acoustic viscous flow force dominates over an acoustic pressure gradient force; and a light intensity detector communicating with said fiber optic probe, wherein, in operation, said transmitting multimode optical fiber transmits light from said light emitting diode toward the edge reflector, said edge reflector reflecting at least a portion of the light toward the at least one receiving multimode optical fiber, wherein an amount of light received by the at least one receiving multimode optical fiber indicates a relative displacement of said edge reflector with respect to the fiber optic probe in a direction perpendicular to the longitudinal axis of the fiber optic probe.

2. The fiber optic acoustic sensor according to claim 1, wherein said light intensity detector comprises one of a PIN detector and a photomultiplier.

3. The fiber optic acoustic sensor according to claim 1, wherein said cantilever comprises one of glass, metal, a hi-metallic material, and plastic.

4. The fiber optic acoustic sensor according to claim 1, wherein said at least one receiving multimode optical fiber comprises four receiving multimode optical fibers, said four receiving multimode optical fibers comprising two pairs of opposing receiving multimode optical fibers.

5. The fiber optic acoustic sensor according to claim 4, further comprising one of a plurality of solid rods and a plurality of dummy optical fibers located between adjacent receiving multimode optical fibers of said four receiving multimode optical fibers.

6. The fiber optic acoustic sensor according to claim 1, wherein said at least one receiving multimode optical fiber comprises six receiving multimode optical fibers, said six receiving multimode optical fibers comprising three pairs of opposing receiving multimode optical fibers.

7. The fiber optic acoustic sensor according to claim 1, wherein said casing comprises a plastic material.

8. The fiber optic acoustic sensor according to claim 1, wherein said fill fluid comprises one of a glycerin solution, an ethylene glycol solution, and a glycerin-water solution.

9. The fiber optic acoustic sensor according to claim 1, wherein said casing comprises an acoustic impedance proximate to a product of a density of fluid external to said casing and a speed of sound in the fluid external to said easing.

10. The fiber optic acoustic sensor according to claim 1, wherein said casing comprises a fill liquid surrounding said probe end and said cantilever rod, wherein said cantilever rod comprises a distal end, wherein said fiber optic acoustic sensor further comprises:

a cantilever mount connected to the distal end of said cantilever rod, and a boot, said fiber optic probe and said cantilever mount being connected to said boot.

11. The fiber optic acoustic sensor according to claim 10, wherein said fill fluid comprises one of a glycerin solution, an ethylene glycol solution, and a glycerin-water solution.

12. The fiber optic acoustic sensor according to claim 10, wherein said boot comprises one of a rubber material and a biaxially-oriented polyethylene terephthalate film material.

13. A fiber optic acoustic sensor comprising:

a light emitting diode;

a fiber optic probe having a transmitting multimode optical fiber and at least one receiving multimode optical fiber, the transmitting multimode optical fiber and the at least one receiving multimode optical fiber being substantially parallel to a longitudinal axis of the probe; said fiber optic probe communicating with said light emitting diode, said at least one receiving multimode optical fiber comprising four receiving multimode optical fibers, said four receiving multimode optical fibers comprising two pairs of opposing receiving multimode optical fibers;

a cantilever comprising a cantilever rod, said cantilever rod comprising a proximal end with an edge reflector located thereon, said edge reflector being spaced apart from the fiber optic probe and oriented to face said fiber optic probe, said edge reflector being able to move in a direction substantially perpendicular to the longitudinal axis of the fiber optic probe; and a light intensity detector communicating with said fiber optic probe, wherein, in operation, said transmitting multimode optical fiber transmits light from said light emitting diode toward the edge reflector, said edge reflector reflecting at least a portion of the light toward the at least one receiving multimode optical fiber, wherein an amount of light received by the at least one receiving multimode optical fiber indicates a relative displacement of said edge reflector with respect to the fiber optic probe in a direction perpendicular to the longitudinal axis of the fiber optic probe, and one of a plurality of solid rods and a plurality of dummy optical fibers located between adjacent receiving multimode optical fibers of said four receiving multimode optical fibers.

* * * * *